June 19, 1951 W. H. GELLES 2,557,183
BRAKE FOR HAND TRUCKS
Filed Feb. 24, 1949 2 Sheets-Sheet 1

INVENTOR.
WILLIAM H. GELLES
BY

June 19, 1951     W. H. GELLES     2,557,183
BRAKE FOR HAND TRUCKS
Filed Feb. 24, 1949     2 Sheets-Sheet 2
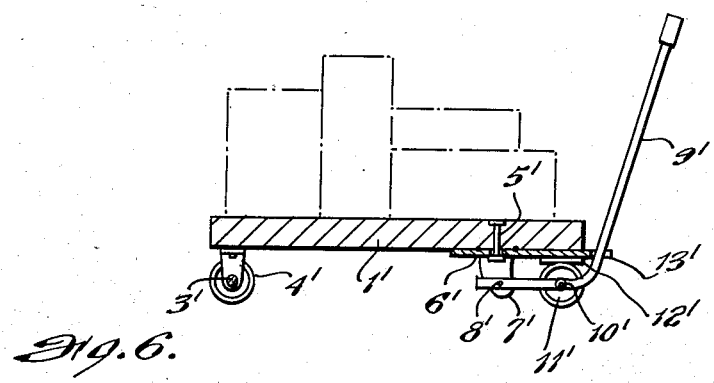
Fig. 6.
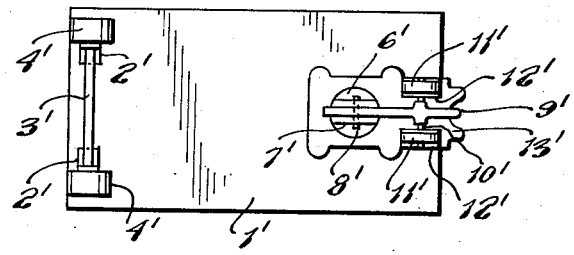
Fig. 7.
Fig. 8.
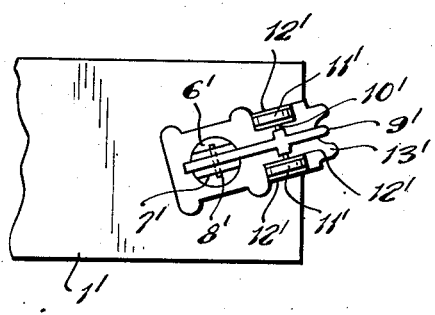
INVENTOR.
WILLIAM H. GELLES
BY Patented June 19, 1951

2,557,183

UNITED STATES PATENT OFFICE 2,557,183

BRAKE FOR HAND TRUCKS

William H. Gelles, New York, N. Y.

Application February 24, 1949, Serial No. 78,143

4 Claims. (Cl. 280—49)

The present invention relates to manually steered and controlled trucks for handling materials, and particularly to braking means for such trucks which may be controlled by the draft handles thereof.

Brake constructions have been proposed in the prior art which are either spring operated or of a rather complicated construction which does not permit of economic manufacture thereof. It has been found that simple brake mechanism is desirable on small hand trucks, in order to prevent movement thereof when on any upgrade or downgrade or when not in operation.

It is, therefore, one of the objects of the present invention to provide improved braking means on a hand truck which may be operated by means of the steering and draft handle of the truck.

It is another object of the present invention to provide improved braking means which are put into operative position upon turning the steering and draft handle of the truck in upright position.

It is still another object of the present invention to provide improved braking means which are put automatically into operative position upon stopping the movement of the truck by the weight of its platform and the load, respectively.

It is yet another object of the present invention to provide improved braking means on a hand truck the brake shoes of which turn with the steering and draft handle and are disposed opposite the front wheels.

With these and other objects in mind which will become apparent in the following detailed description, the present invention will be clearly understood in connection with the accompanying drawings in which:

Fig. 6 is a side elevation of a second embodiment of the braking arrangement of a hand truck;

Fig. 7 is a bottom plan view thereof; and

Fig. 8 is a fragmentary bottom plan view of the embodiment shown in Fig. 6 with the pulling handle and brake arrangement in inclined position.

Figure 1:
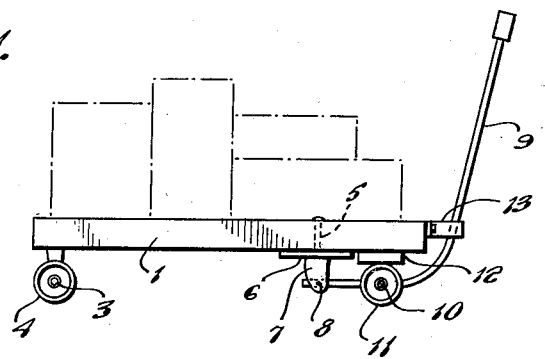
Figure 1 is a side elevation of a hand truck with the braking means in operative position.
Figure 2:
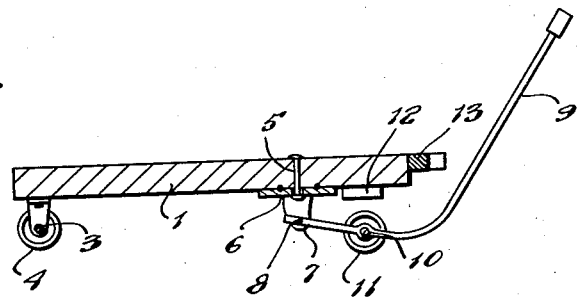
Fig. 2 is a side elevation of a hand truck with the braking means in inoperative position.
Figure 3:
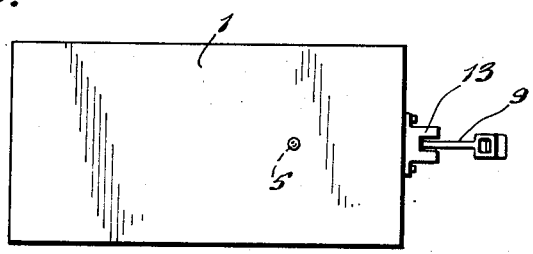
Fig. 3 shows a top plan view of the hand truck shown in Fig. 1.
Figure 4:
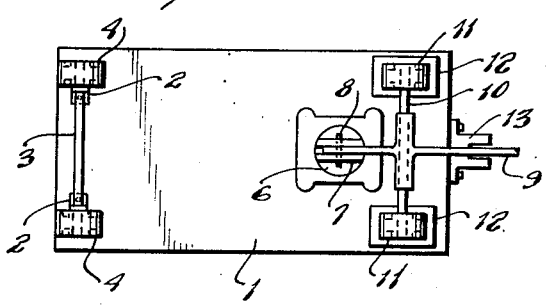
Fig. 4 shows a bottom plan view of the hand truck shown in Fig. 1.
Figure 5:
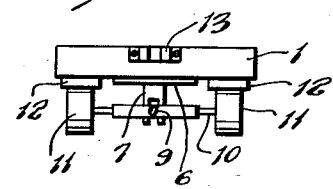
Fig. 5 shows a front end view of the hand truck.

Referring now to the drawing, and particularly to Figs. 1 to 5, the hand truck comprises a platform 1 which, as shown in Fig. 4, has secured to its bottom two bearings 2 which support the rear axle 3. The latter carries adjacent its ends the rear wheels 4.

A swivel stem 5 is inserted into the platform 1 on its longitudinal axis in some distance from its front end, which stem 5 carries a member 6 extending from or formed integrally with a plate. The member 6 forms a forked portion 7 which carries a horizontal bolt 8. The latter serves as pivot for the rear end of a steering and draft handle 9, which thus permits movement of the latter in a vertical plane, while the member 6 together with the draft handle 9 turns on the stem 5 thereby permitting steering operation of the draft handle 9.

The front axle 10 carries adjacent its ends the front wheels 4, and is completely disconnected from the platform 1 and forms a second pivot for the steering and draft handle 9. This construction permits of turning of the draft handle 9 around the front axle 10 in such manner that a lowering of the front end of the draft handle 9 will bring about a lifting of its rear end, and thereby, a raising of the front portion of the platform 1, which moves down by its own weight and that of the load when the draft handle 9 is in upright position.

Two brake-shoes 12 are also secured to the bottom of the platform 1 by any convenient means which are disposed opposite the two front wheels 11 when the draft handle 9 is in straight position along the longitudinal axis of the truck. The bottom faces of the brake-shoes 12 may be formed complementary to the outer face of the front wheels 11, though such arrangement is not essential. The brake-shoes 12, as shown in the drawing, are made preferably of rectangular blocks which merely contact the circumference of the front wheels 11 in operative position.

A guide 13 projects from the front end of the platform 1 which guide is adapted to center the draft handle 9 when the truck does not move and thereby to turn the front wheels 11 into a position opposite the brake-shoes 12.

The operation of the braking means is apparent from the above description. When the truck stands still, the brake-shoes 12 are operative by the weight of the platform 1 and of the load thereon. At the same time the draft handle 9 is set into upright position, thereby preventing any accident due to slipping over the handle. If, however, the truck is to be moved, the handle 9 will be turned forward on the front axle 10 as pivot into the position shown in Fig. 2. This turning movement of the handle 9 at the same time will lift the front end of the platform 1 and thereby, the brake-shoes 12 from contact with the front wheels 11 and permit of movement of the truck. Since the turned handle 9 leaves also the guide 13 steering of the handle 9 is possible in view of the provision of the swivel stem 5 which permits of turning of the extension member 6 together with the draft handle 9 on the swivel stem 5.

Referring now to the Figs. 6 to 8 which disclose a preferred embodiment of the braking arrangement, the hand truck comprises again a platform 1' which is supported by the rear wheels 4' mounted on the rear axle 3' which runs in two bearings 2'.

A swivel stem 5' is provided in the platform 1' on its longitudinal axis in some distance from its front end, a member 6' extending from or formed integrally with a plate member is pivoted on said stem 5'. The member 6' forms also a forked portion 7' which supports a horizontal bolt 8'. The plate member extends to the front end of the platform 1' and carries at its bottom face a pair of brake shoes 12'. The rear end of a steering and draft handle 9' is pivoted on the bolt 8' to turn in a vertical plane. The front axle 10' forms a second pivot for the draft handle 9' and the front wheels 11' carried by the front axle 10' turn sidewards with the steering of the draft handle 9'. Since the brake shoes 12' are secured to the bottom face of the plate member, they will in this embodiment permanently be positioned opposite the front wheels 11'. The front end of the said plate member is equipped with the forked guide member 13' which receives the draft handle in upright position.

The operation of the braking means disclosed above as second embodiment is similar to that of the first embodiment. The second embodiment has, however, the advantage that braking action takes place even when the draft handle 9' is in an angular position. Otherwise the braking action is achieved by means of the weight of the truck or of the load which results in pressing the brake-shoes 12' on the front wheels 11', the draft handle 9' being in upright position. If, however, the front end of the draft handle 9' is turned down by turning on the front axle 10' as pivot, its rear end will be lifted thereby raising the front end of the platform 1'. The latter step brings about removing of the brake-shoes 12' from contact with the front wheels 11' and thereby permits free movement of the truck.

While I have disclosed two embodiments of the present invention, it is to be understood that these embodiments are given by example only and not in a limiting sense, the scope of the present invention being determined by the objects and the claims.

I claim:

1. In a hand truck, a platform, a member pivoted to said platform to turn in a plane parallel to said platform, a bolt member horizontally disposed in said member, a front axle carrying at least one wheel, a draft handle pivoted to said front axle intermediate its ends and pivoted to said bolt member at its rear end for turning in a vertical plane, and brake-shoes disposed opposite said wheel at least in the straight forward position of said draft handle, and engaging said wheel of the front axle by the weight of the load of the truck in operative position of the latter, upon permitting of lowering of said platform, and said brake shoes disengaging said wheel upon lowering the front end of said draft handle and thereby lifting the front end of said platform in operative position of said truck.

2. In a hand truck, a platform, a plate member disposed below said platform, a swivel stem in said platform securing the plate member to the latter to turn in a plane parallel to said platform, a horizontal stem received in a forked extension of said plate member, a front axle having at least one wheel, a draft handle pivoted intermediate its ends to said front axle to swing in a vertical plane, the rear end of said draft handle pivoted to said horizontal stem, a brake-shoe disposed opposite each wheel at least in the straight forward position of said draft handle, and engaging said wheel of the front axle by the weight of the load of the truck in operative position of the latter, upon permitting of lowering of said platform, and said brake shoes disengaging said wheel upon lowering the front end of said draft handle and thereby lifting the front end of said platform in operative position of said truck.

3. The hand truck, as set forth in claim 1, in which said brake-shoe is secured to the bottom face of the platform to be ready for braking action when the draft handle is in straight forward and upright position.

4. The hand truck, as set forth in claim 1, in which said plate member carries said brake-shoes opposite the front wheels and thereby steering the brake-shoes together with the front wheels and assuring braking action regardless of the steering position of the draft handle.

WILLIAM H. GELLES.

REFERENCES CITED

The following references are of record in the file of this patent:

UNITED STATES PATENTS

| Number | Name | Date |
| --- | --- | --- |
| 1,234,667 | Howe et al. | July 24, 1917 |
| 1,588,419 | Hickey | June 15, 1926 |
| 1,728,839 | Staley | Sept. 17, 1929 |
| 2,248,398 | Thorne | July 8, 1941 |